J. M. BREITENBACH.
ELECTRIC MOTOR.
APPLICATION FILED MAR. 23, 1917.

1,348,539.

Patented Aug. 3, 1920.
2 SHEETS—SHEET 1.

INVENTOR.
Julius M. Breitenbach
BY
Raegener + Motty
ATTORNEYS.

J. M. BREITENBACH.
ELECTRIC MOTOR.
APPLICATION FILED MAR. 23, 1917.

1,348,539.

Patented Aug. 3, 1920
2 SHEETS—SHEET 2.

UNITED STATES PATENT OFFICE.

JULIUS M. BREITENBACH, OF NEW YORK, N. Y.

ELECTRIC MOTOR.

1,348,539.

Specification of Letters Patent.

Patented Aug. 3, 1920.

Application filed March 23, 1917. Serial No. 156,924.

*To all whom it may concern:*

Be it known that I, JULIUS M. BREITENBACH, a citizen of the United States, and a resident of New York, in the county of New York and State of New York, have invented certain new and useful Improvements in Electric Motors, of which the following is a specification.

This invention relates to electric motors of that type wherein the field magnet and the armature rotate in opposite directions, and the prime object of the present invention is to provide for actuating two driven members simultaneously in the same direction.

The present invention, while applicable in many relations, is particularly designed for motor vehicle use, as the motor of the type described operates as an efficient differential and thus obviates the necessity of providing a separate differential.

Referring to the drawings:

Figure 1 is a sectional view on the line 1—1 of Fig. 3, showing an electric motor, more or less diagrammatically in which the armature rotates in one direction and the field in the other direction, together with reduction gearing made in accordance with the invention. The figure also shows a portion of an automobile wheel with parts broken away connected to the shaft driven by the armature. The automobile wheel connected to the shaft driven by the field is not shown.

Figure 1:
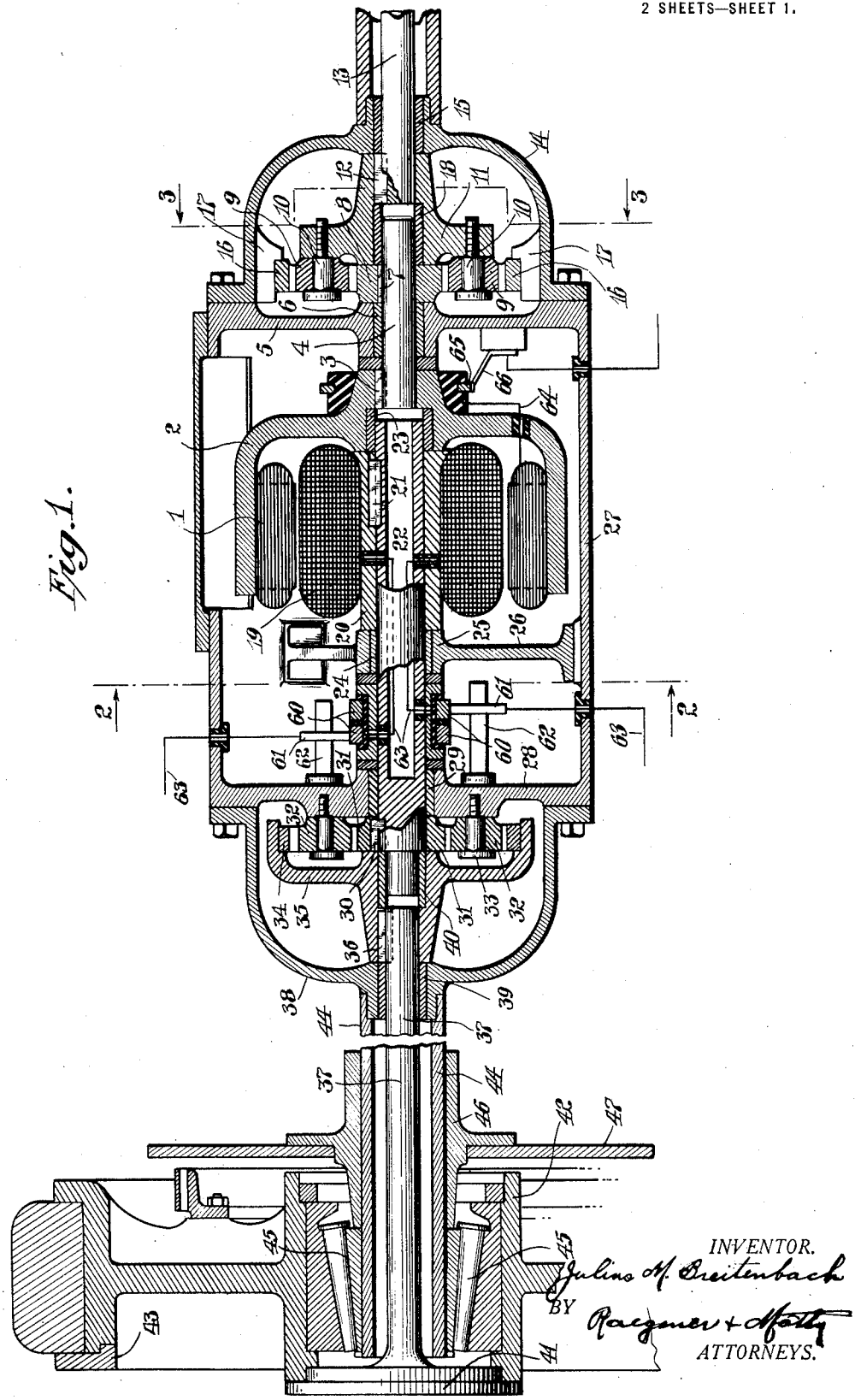
Figure 2:
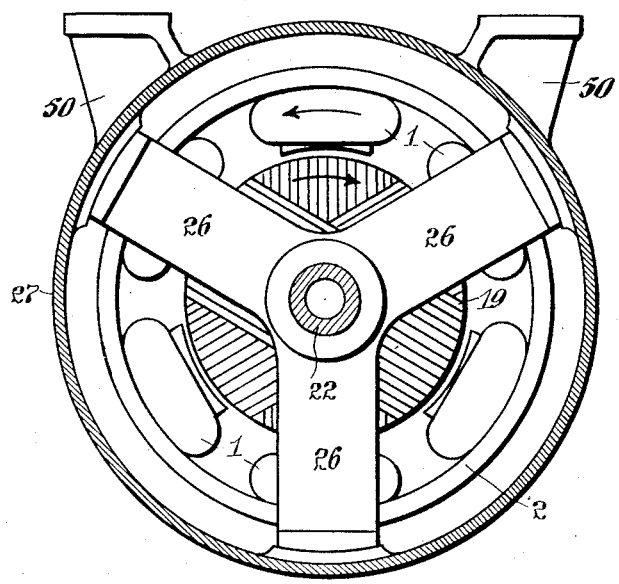
Fig. 2 is an end view partly in section on the line 2—2 of Fig. 1 showing the armature and field coils of the motor.
Figure 3:
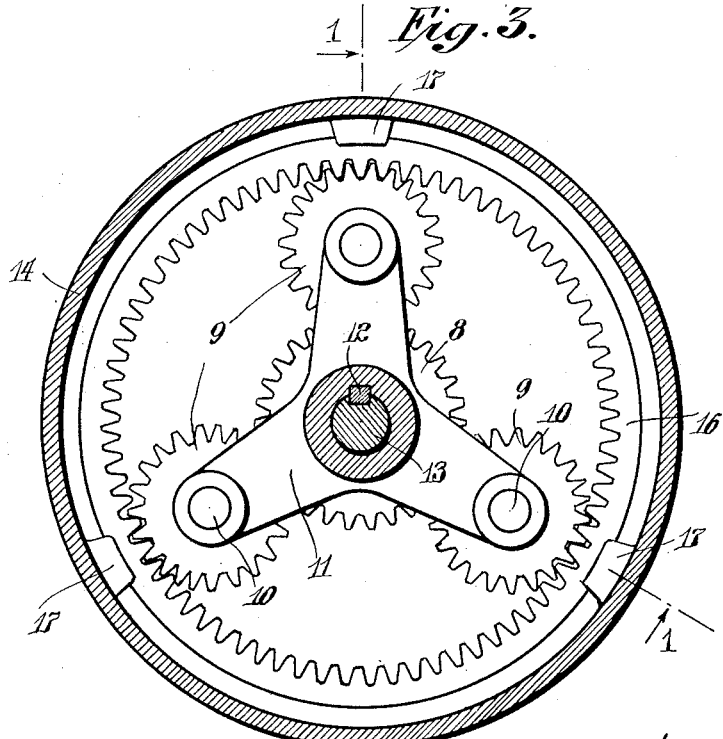
Fig. 3 is an end view partly in section on the line 3—3 of Fig. 1 showing the reduction gearing operated by the field by means of which the automobile wheel shaft connected thereto is rotated in a direction opposite to the direction of rotation of the field.

In the present instance 1 designates the field-magnets which are supported upon a suitable cylindrical field-frame 2 which is keyed, by means of a key 3, to the short shaft 4, which is journaled in the bearing member 5, which forms a part of the casing by means of a bushing 6. Suitably keyed to the short shaft 4, by means of a key 7, is a small gear 8 which meshes with a plurality of small planetary gears 9 rotatably mounted, by means of bearing pins 10, upon the outer ends of the arms of a spider 11 which is keyed, by means of a key 12, to one end of a driven shaft 13 journaled in the end casing 14 by means of a bushing 15. The planetary gears 9 are also arranged to mesh with a large internal gear 16, secured to the end casing 14 by means of suitable supports 17. For purposes of construction the outer end of the short shaft 4 is journaled in the spider 11 by means of a bushing 18.

From the above description it will be seen that when in the operation of the motor the field-frame is rotated, the short shaft 4, keyed thereto, is also rotated and with it the small gear 8, also keyed to the small shaft 4. The small gear 8 rotating in one direction rotates the small planetary gears 9, with which it meshes, in the opposite direction, and the planetary gears 9, all of which mesh with the stationary large internal gear 16, rotate the spider upon which the planetary gears are mounted, together with the driven shaft 13, in the same direction as the direction of rotation of the field-frame, but at a much reduced speed.

In the present instance 19 designates the armature which is mounted upon a suitable sleeve 20 keyed, by means of a key 21, to the inner end of a short hollow shaft 22 which is journaled at one end in a suitable bushing 23 mounted in the field-frame 2. The short hollow shaft 22 is also journaled midway of its length in a suitable bushing 24, mounted in a suitable bearing 25, supported by means of radial arms 26 secured to the casing 27. Near the other end of the short hollow shaft 22 the same is journaled, in the bearing member 28, which forms a part of the casing, by means of a bushing 29.

Adjacent the outer end of the short hollow shaft 22 is keyed, by means of a key 30, a small gear 31 which meshes with a plurality of small gears 32 mounted, by means of bearing pins 33, upon the bearing member 28. The gears 32 are also arranged to mesh with a large internal gear 34 secured to a hub member 35 keyed, by means of a key 36, to one end of a driven shaft 37, which is journaled in the end casing 38 by means of a bushing 39. For purposes of construction the outer end of the short hollow shaft 22 is slightly reduced in diameter and is journaled in the hub-member 35 by means of a bushing 40.

From the above description it will be seen that when in the operation of the motor the armature is rotated, which is in a direction opposite to that of the field-frame, the short hollow shaft 22, keyed thereto, is also rotated and with it the small gear 31, also keyed to the small hollow shaft 22. The small gear 31 rotating in one direction rotates the small gears 32, with which it meshes, in the opposite direction, and the gears 32, all of which mesh with the large internal gear 34, rotate the hub-member 35 and with it the driven shaft 37 in a direction opposite to direction of rotation of the armature, but at a much reduced speed.

From the above description it will be seen that the reduction gearing interposed between the field and the automobile wheel shaft driven thereby is substantially the same as the reduction gearing interposed between the armature and the other automobile wheel shaft driven by the armature. As the direction of rotation of the field is in one direction and that of the armature in the other, it is necessary in transmitting to reverse the driving power of either the field or the armature. In the present instance the direction of rotation of the automobile wheel shaft driven by the field is in the same direction as the direction of rotation of the field, and to accomplish this purpose the large internal gear 16 is made stationary whereas the small planetary gears 9 supported on the spider 11 rotate the same and with it the automobile wheel shaft 13 in the same direction as the direction of rotation of the field, as before described.

As the direction of rotation of the automobile wheel shaft driven by the armature is opposite to the direction of rotation of the armature the large internal gear 34 is not made stationary but is secured to the hub-member 35 and rotates with the automobile wheel shaft 37, the small gears 32 being mounted in the casing as before described.

The driven shaft 37 is provided at its outer end with a suitable cap 41 for engaging one side of a hub 42 secured to a suitable automobile wheel 43. Suitably secured to the end casing 38 is a hollow shaft 44 upon which is mounted a suitable roller bearing 45. The hollow shaft 44 is also provided with a suitable sleeve which supports one portion of a suitable brake 47 the other part of which is secured to the automobile wheel 43. The driven shaft 13 is similarly secured to an automobile wheel the same not being shown.

The casing 27 is provided with suitable brackets 50 by means of which the same can be secured to the frame of an automobile or similar vehicle.

Suitable collector rings 60, each of which is contacted by one of two brushes 61 secured to suitable supports 62 mounted on one end of the casing 27, are provided which are insulated from and secured to the short hollow shaft 22 and rotate therewith. The collector rings 60 are connected by suitable wires 63, which pass through the hollow portion of the shaft 22, with the armature.

The field coils are connected by means of a wire 64 to a collector ring 65 suitably insulated and mounted upon the field-frame, a suitable brush 66 mounted on the side of the casing being provided which engages the collector ring 65.

What I claim is:

1. In an electric motor, a field magnet and an armature rotating in opposite directions, a stationary casing inclosing the said motor elements and independent thereof, independent drive shafts extending through and having bearings in respective ends of the casing and carrying the field magnet and armature respectively, opposite driven members maintained in axial alinement with the drive shafts, and gearing between each drive shaft and the adjacent driven shaft, one gearing driving its driven shaft in a direction opposite to that of its driving shaft.

2. In an electric motor, a field magnet and an armature rotating in opposite directions, a casing inclosing the said motor elements, independent drive shafts extending through and having bearings in respective ends of the casing and carrying the field magnet and armature respectively, opposite driven members maintained in axial alinement with the drive shafts, and gearing between each drive shaft and the adjacent driven shaft, one gearing driving its driven shaft in a direction opposite to that of its driving shaft, and gearing housings carried by the casing, the casing and said housings constituting lubricant containers and dust excluding means.

3. In an electric motor, the combination of a casing, a field magnet and an armature rotating in opposite directions within the casing, independent drive shafts extending through and having bearings in respective ends of the casing and carrying the field magnet and armature respectively, a housing carried by each end of the casing, driven members entering the respective housings, and gearing connecting each driving shaft with its adjacent driven shaft and within one of the housings, one gearing including a rotatable internal gear connected to the driven shaft, an external gear carried by the driving shaft, and pinions mounted upon the adjacent end of the casing and in mesh with the internal and external gears, the other gearing including an external gear carried by the driving shaft, a fixed internal gear upon the housing, and a member rotatable with the driven shaft and carrying pinions in mesh with the internal and external gears.

4. The combination of an electric motor including a field magnet and an armature rotating in opposite directions, opposite driven members maintained in axial alinement with the axis of the motor, a fixed internal gear concentric with the axis of the motor, an external driving gear driven by one of the elements of the motor and disposed within the fixed gear, a rotatable member connected to one of the driven members and carrying pinions in mesh with the fixed internal gear and the driving gear, a rotatable internal gear connected to the other driven member and concentric with the axis of the motor, a second driving gear driven by the other element of the motor, and pinions meshed with the internal gear and the second driving gear and fixed on pivots with respect to the second driving gear and rotatable internal gear.

In testimony whereof I have signed this specification in the presence of two subscribing witnesses.

JULIUS M. BREITENBACH.

Witnesses:
LEO J. MATTY,
E. S. ROSS.